(12) United States Patent
John et al.

(10) Patent No.: US 9,242,175 B2
(45) Date of Patent: Jan. 26, 2016

(54) SPECIALTY WITHIN ONLINE GAME

(75) Inventors: Michael Taylor John, San Francisco, CA (US); William Graham, San Francisco, CA (US); Xian Yang (Kenji) Low, San Francisco, CA (US); Josh Wickham, San Francisco, CA (US); Alexi Chialtas, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 366 days.

(21) Appl. No.: 13/300,363

(22) Filed: Nov. 18, 2011

(65) Prior Publication Data
US 2013/0130762 A1 May 23, 2013

(51) Int. Cl.
*A63F 13/00* (2014.01)
*A63F 13/30* (2014.01)
*A63F 13/69* (2014.01)

(52) U.S. Cl.
CPC ............... *A63F 13/12* (2013.01); *A63F 13/69* (2014.09); *A63F 2300/556* (2013.01); *A63F 2300/609* (2013.01); *A63F 2300/8094* (2013.01)

(58) Field of Classification Search
CPC ................................ A63F 13/12; A63F 13/69
USPC .................................................... 463/9
See application file for complete search history.

(56) References Cited

U.S. PATENT DOCUMENTS

| | | | | |
|---|---|---|---|---|
| 6,287,560 | B1 * | 9/2001 | Fujii ............................ | 434/127 |
| 6,951,516 | B1 * | 10/2005 | Eguchi et al. ................. | 463/40 |
| 2004/0143852 | A1 * | 7/2004 | Meyers ......................... | 725/133 |

* cited by examiner

*Primary Examiner* — Milap Shah
*Assistant Examiner* — Thomas H Henry
(74) *Attorney, Agent, or Firm* — Martine Penilla Group, LLP

(57) ABSTRACT

Embodiments are presented for executing an online game. One method includes an operation for creating an animation on a game board that is associated with a player. The animation includes a non-player character that delivers an invitation to start a master mission having quests. If the player accepts, an application from the player is received to start the master mission, the application including the selection of a specialty from a plurality of specialties available for the master mission. The method further includes an operation for delivering a quest reward after completing at least one of the quests from the plurality of quests, where the quest reward includes a wearable status item for an avatar of the player in the game board. In addition, a master reward is delivered after the completion of the master mission. The master reward includes the ability to perform game operations associated with the specialty.

20 Claims, 10 Drawing Sheets

SPECIALTY WITHIN ONLINE GAME

BACKGROUND

1. Field of the Invention

The present invention relates to methods for playing online social games, and more particularly, methods, systems, and computer programs for obtaining a specialty skill within an online game.

2. Description of the Related Art

Online games that allow players to interact with other players have become popular. Some online games, such as chess or bridge, have a small number of players that play together at the same time. Other online games, such as Massively Multiplayer Online (MMO) games, can have a large number of players playing simultaneously. Online game operators, also referred to as social game operators, harness the power of online social networks, to design games that closely integrate the players' social graph data with their existing friendship connections.

In many games, users are given quests or missions in the game. After each quest is completed, the player obtains a reward and progress is made in the game, which includes the assignment of new quests to enable further progress. However, games often follow a linear path, where tasks are not given until a previous task, or a set of tasks, is completed. The linear path followed in the game, does not allow players to differentiate against the progress made by other players, nor provide a distinctive characteristic for the player within the online game. This is especially important in social online games, where players cooperate with friends to play the online game. It is in this context that embodiments arise.

SUMMARY

Methods, systems, and computer programs are presented for executing an online game. In one embodiment, a method includes an operation for creating an animation on a game board that is associated with a player of the online game. The animation includes a Non-Player Character (NPC) that delivers an invitation to start a master mission, which has a plurality of quests. If the player accepts, an application from the player is received to start the master mission, where the application includes the selection of a specialty from a plurality of specialties available for the master mission. The method further includes an operation for delivering a quest reward after completing at least one of the quests from the plurality of quests, where the quest reward includes a wearable status item for an avatar of the player in the game board. In addition, a master reward is delivered after the completion of the master mission. The master reward includes the ability to perform game operations associated with the specialty, and at least one operation of the method is executed through a processor.

In another embodiment, a method for executing an online game includes an operation for detecting a request sent from a first player to a second player to cooperate in the online game, where the second player has a specialty from a plurality of specialties. The specialty is obtained after completion of a master mission by the second player. Further, an acceptance of the request from the second player is detected, and a specialty reward is delivered to the second player after the second player performs a game operation utilizing the specialty in a game board of the second player. Additionally, the method includes an operation for sending the specialty reward to a game board of the first player, where the specialty reward is operable to be utilized by the first player in the game board of the first player, and at least one operation of the method is executed through a processor.

In yet another embodiment, a method for executing an online game includes an operation for delivering, to a first player, an invitation to start a master mission that includes a plurality of quests. A master reward is delivered after completion of the master mission, where the master reward includes the ability to perform game operations associated with a specialty from a plurality of specialties. Further, the method includes an operation for delivering a specialty reward to the first player after the first player performs a game operation utilizing the specialty. In addition, a specialty reward is sent from the first player to a second player. The specialty reward is operable to be utilized by the second player in a game board of the second player, and at least one operation of the method is executed through a processor.

The present disclosure is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process operations and structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

BRIEF DESCRIPTION OF THE DRAWINGS

The invention may best be understood by reference to the following description taken in conjunction with the accompanying drawings.

DETAILED DESCRIPTION

Methods, systems, and computer programs for executing an online game are provided. Players of the online game are given an opportunity to obtain a specialty in the game by completing a series of quests. Once the specialty is obtained, the player is able to perform game operations that would not be available without having the specialty. It will be apparent, that the present embodiments may be practiced without some or all of these specific details. In other instances, well known process operations have not been described in detail in order not to unnecessarily obscure the present embodiments.

Figure 1:
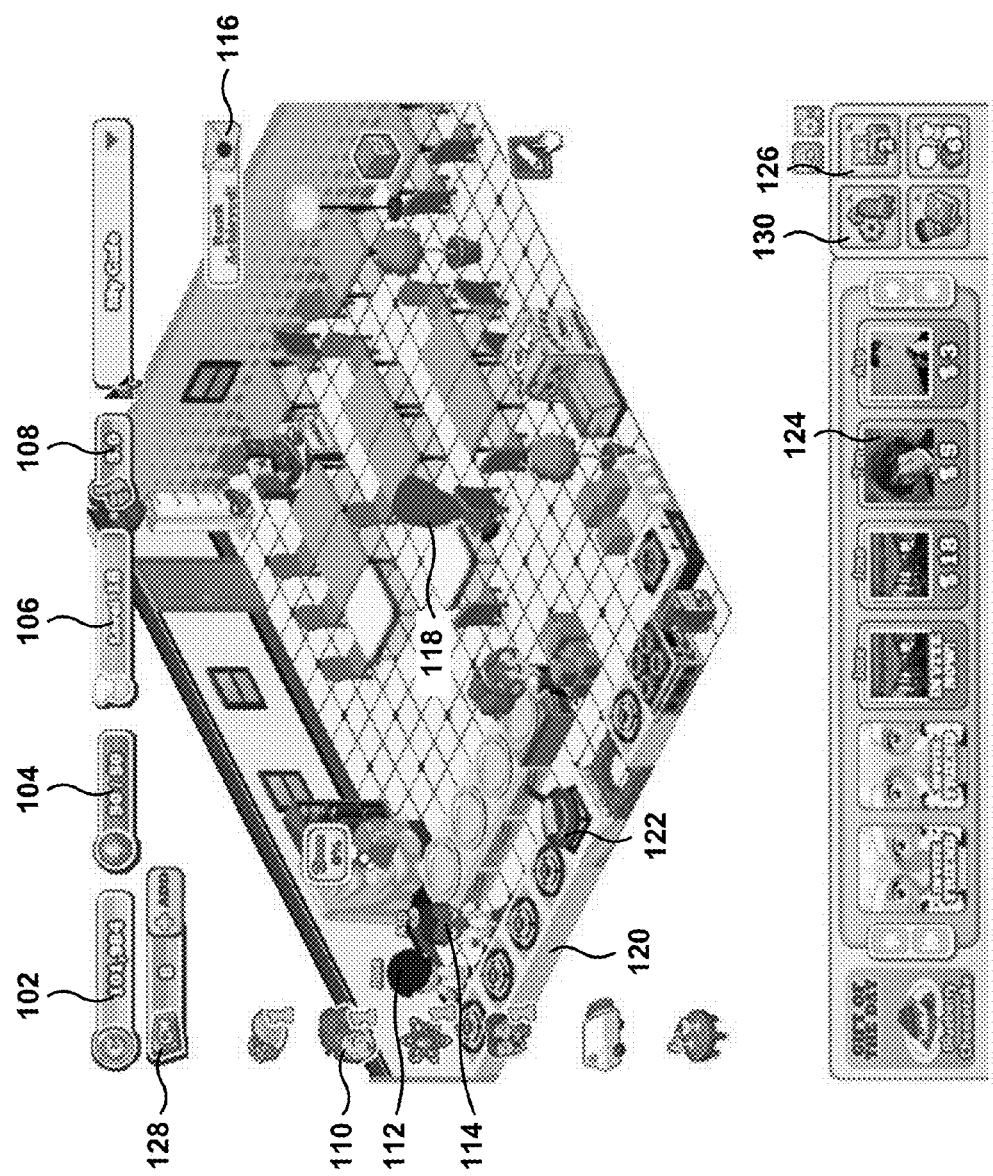
FIG. 1 shows the stage of an online game, according to one embodiment.

FIG. 1 shows the stage of an online game, according to one embodiment. In one embodiment, the game includes a three-dimensional view of a café that evolves as the player makes progress in the game. As the player advances in the game, the player acquires assets, which can take multiple forms. In one embodiment, assets include first virtual currency asset 102, second virtual currency 128, goods 120 (e.g., a cooking range, a table, decoration for the café), energy asset 104, expansions, crops, badges, badge collections, temporally tiered levels, bonuses, promotions, penalties, digital content (e.g., image files, icons, audio files, video files), gifts, tokens, honor title, rewards, invitation permissions, avatars, rally points, diaries, footprints, trophies, competitions, engagement modes, user difficulty modes (e.g., novice, intermediate, expert), stars, medals, gems, pets, exploration quests, etc. Each asset can be used for one or more purposes. For example, first virtual currency 102 can be used during the game to make progress, also referred to herein as advancement. The first virtual currency 102 can be used to acquire assets (e.g., buildings or decorations), to remove an obstacle in the game (e.g., enabling progress that would otherwise be blocked), or to complete a task (e.g., finish decorating a house).

In one embodiment, the online game includes missions 110, which identify one or more tasks that the player must complete before the mission is considered satisfied or finished. For example, a mission may require three tasks: serving fifty cheeseburgers, visiting a friend, and purchasing an expansion of the café area. Upon completion of the mission, the player obtains a reward, such as getting a new asset, increasing the amount of energy, getting more virtual currency, increasing the level obtained in the game 106, increasing a client rating score 108, etc.

Clicking on inventory icon 126 causes the online game to display a list of all the items or assets owned by the player. In addition, clicking on market icon 130 takes the player to a virtual marketplace where assets (e.g., chairs) can be acquired. As described above, assets can be from within different categories such as buildings, decorations, housing, businesses, crops, trees, animals, energy, special items, weapons, etc. Each category includes a plurality of assets within the category. For example, the decorations category includes chairs, doors, tables, floors, walls, windows, etc. Some of the items within a category can be freely acquired by the player, while purchasing of some items can be blocked until certain game condition is met, such as reaching some score, finishing a mission, purchasing the ability to unblock the blocked item, etc.

In one embodiment, the online game is an online social game, which leverages social relationships between the player and other online game players socially linked to the player. For example, the player may add a neighbor 124 to the game by inviting a friend from a social networking site. A neighbor of a first player, as referred to herein, is a second player that has established a social relationship (i.e., a social link) in the online game with the first player. The social relationship is typically established by having one player inviting the other player to become a neighbor, and then the other player accepting the invitation. Once the invitation is accepted, both players are "neighbors." A neighbor may also be referred to as a friend, a crew member, a "buddy," a partner, an ally, etc.

There are many types of online social networks run and maintained by various companies, and any one of these companies can provide access to social graph data. Some examples of companies, without limitation to others, may include Facebook, Google+®, Yahoo!® Groups, Linkedin®, etc. Once a friend accepts being a neighbor, a social relationship is established in the game where the game played by the player and the game played by the neighbor can interact with each other. For example, the player may visit the game board (e.g., city) of the neighbor and perform some game activities therein, and will be rewarded for doing so. Some of the missions in the game may include social activities that promote the interaction between players. For example, one mission may include spicing a neighbor's dish. Therefore, the social interaction can provide advancement for the player and for the neighbor.

In one embodiment, a game board is created the first time the player plays the online game. The game board can be a café, a city, a farm, a forest, an island, etc., and the game board may also be referred to as the player's world, environment, playground, etc. As the player makes progress in the game, the game board changes by adding assets (e.g., adding stoves, tables, soda machines, etc.), or by removing obstacles (e.g., cutting down a tree). Each player manages her own game board, although other players linked to the player (e.g., neighbors) in the online game may help by visiting and performing activities in the neighbor's game board. In one embodiment, only the players socially linked to the owner of the game board can visit to perform game activities therein.

It is noted that the embodiments illustrated in FIG. 1 are exemplary. Other embodiments may utilize different assets, missions, social interactions, etc. The embodiments illustrated in FIG. 1 should therefore not be interpreted to be exclusive or limiting, but rather exemplary or illustrative.

When a player wishes to visit the game board of a neighbor, the player selects an option in the game to visit the neighbor. For example, clicking on the "visit" button next to the icon of player 124. A sample interface for visiting a neighbor is described below with reference to FIG. 6. The game loads the game board of the neighbor, and the player is given certain options to interact with the game within the game board of the player. Typically, the interaction will create a benefit for the player and a benefit for the neighbor. It should be noted that the activities that player can perform while visiting a neighbor's game board may be similar to the activities that the friend may perform in her own game board. However, there may be some activities that the friend may perform while visiting and that the player cannot perform in her own game board, and vice versa.

In one embodiment, the game includes an avatar 112 associated with the player online game. As the player perform games activities, the avatar performs corresponding animations (e.g., cooking a meal on the stove) for the games activities. In another embodiment, a Non-Playing Character (NPC) 114 named after a neighbor of the player is included to assist player with some game activities, such as serving meals to customers 118. However, the NPC 114 is not controlled by the neighbor.

Figure 2:
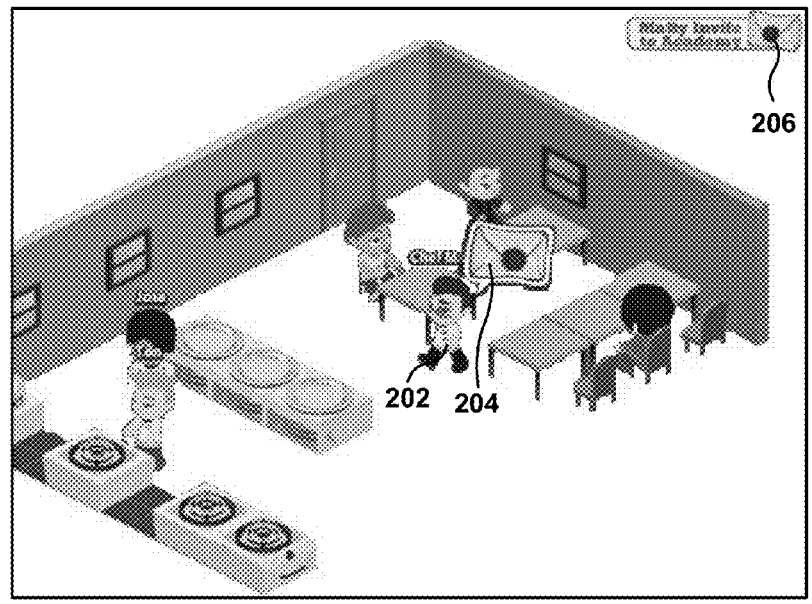
FIG. 2 shows an animation by a Non-Playing Character (NPC) delivering an invitation to obtain a specialty, according to one embodiment.

FIG. 2 shows an animation by a Non-Playing Character (NPC) delivering an invitation to obtain a specialty, according to one embodiment. Café World™ is an online game provided by Zynga Inc., the assignee of the present application. Embodiments of the invention are described with reference to Café World, but the principles presented here can be utilized with other online games. The embodiments illustrated in a Café World environment should therefore not be interpreted to be exclusive or limiting, but rather exemplary or illustrative.

As used herein, the Cooking Academy is a type of master mission in a cooking game. The master mission is a type of mission that includes a plurality of quests to be completed by the player. Upon completion of the plurality of quests, the master mission is considered completed and a master reward is delivered to the player. The master reward includes at least an ability to perform game operations that could not be performed without having completed the master mission. It should be noted that the quests associated with the master mission are different from other quests found in the game, because the quests associated with the master mission are used to make progress towards finishing the master mission, but not necessarily to make progress in the game outside of the master mission. On the other hand, quests not associated with the master mission are used to make progress in the game.

In one embodiment, the master mission is to graduate from the Cooking Academy. Upon graduation from the Cooking Academy, a specialty in certain type of cooking is awarded to the player, the specialty being a type of master reward. In one embodiment, the specialty relates to a type of cooking, such as Italian food, Chinese food, Japanese food, Spanish food, etc. In other embodiments, other type of specialties can be obtained by the player, such as desserts, barbecue, wedding cakes, fruit baskets, fast food, cooking for a large number of people, etc.

When the player acquires the specialty, the player becomes a Master Chef in that particular specialty, and the player is then able to perform game activities not available to players without the specialty, i.e., players that are not Master Chefs with that specialty. For example, a Japanese-food Master Chef is able to cook a variety of sushi dishes, while an Italian-food Master Chef is able to cook a variety of pizzas. However, the Japanese-food Master Chef is not able to cook the pizzas that the Italian-food Master Chef can cook, and the Italian-food Master Chef is not able to cook the sushi dishes that the Japanese-food Master Chef can cook.

In one embodiment, a software module includes a binary flag associated with the specialty. For example, the flag has a logical value of 0 when the specialty has not been obtained, and a logical value of 1 after the specialty has been obtained, but other values are also possible. Since there is a plurality of specialties, and each specialty has an associated flag, there is a plurality of flags to define which specialties the player has achieved. When the game begins, the player does not have any specialty yet, therefore the flags are initialized with a logical value of 0, and when the player obtains the specialty, the corresponding flag for that specialty is set to a logical value of 1.

In another embodiment, the flag associated with the specialty may have one of a plurality of values, each value associated with a specialty level. As the player progresses in the game, and performs operations to improve cooking abilities, the level within the specialty is increased. After obtaining each new level, a new set of dishes within the specialty are unlocked for the player to cook. The game includes a mapping table that defines which dishes are available for cooking, based on the specialty, or specialties, obtained by the player, and based on the level within the specialty, if a level has been defined.

In Café World, an NPC 202 enters into the café (i.e., the game board of the player) and delivers an invitation letter 204 to attend the Cooking Academy. The game performs an animation, which includes motion by the NPC, on the game board. In the animation, the NPC delivers the invitation to start the Cooking Academy, which includes a plurality of quests. In one embodiment, a copy of the invitation letter 206 is placed on the game board of Café world, which allows the player to read the invitation again in the future.

In one embodiment, the animation includes the NPC 202 entering the café door, walking inside the café, and presenting the invitation 204 to the player. The animation also includes a sound sequence associated with the invitation by the Master Chef (NPC 202). The NPC interacts with the player, and the NPC is not related to the normal game activities, where the normal game activities include cooking dishes, serving the dishes to Café customers, having the Café customers eat the served dishes, etc. Once the player clicks, or somehow selects, the invitation 204, a message is displayed to invite the player to the Cooking Academy, as described below with reference to FIG. 3.

In one embodiment, the invitation is delivered by the NPC after the game detects that the player in the online game has reached a predetermined level or achievement. In another embodiment, players in the online game may send referrals in order to have the game invite neighbors to the Cooking Academy. The invitation is delivered by the NPC after the game detects that a neighbor of the player in the online game has sent a referral to invite the player to the Cooking Academy. In one embodiment, a player needs referrals from 2 or more neighbors before being invited to the Academy, but requiring a different number of referrals is also possible. Having friends refer the player to the Cooking Academy fosters social interactions within the online game.

In one embodiment, a plurality of animations is available to deliver the invitation by the NPC. The type of animation delivered by the game is a function of the profile of the player, the demographics of the player (e.g., age, gender, city of residence, profession, etc.), the friends of the player (e.g., specialties already obtained by the friends), the current configuration of the game board, the level of the player in the game, etc. One or more lookup tables are available to determine which kind of animation is selected to deliver the invitation, based on one or more of the parameters described above.

Figure 3:
FIG. 3 shows an invitation to the cooking academy, according to one embodiment.

FIG. 3 shows an invitation to the cooking academy, according to one embodiment. The invitation asks the player to join the Academy and describes the benefits of graduating from the Cooking Academy. In one embodiment, the invitation reads as follows: "Dear player, if you graduate from the Cooking Academy, famous World Chefs will teach you their cooking secrets. You are invited to join us, but first, qualify for the Academy by finishing basic tasks. You're on your way to amazing rewards!"

A button 302 is provided for the player to accept the invitation. Before entering the Cooking Academy, the player must "submit an application." To complete the application, the player must complete some basic tasks (i.e., quests). In addition, the player must select (not shown) a specialty for the Cooking Academy from a plurality of specialties available for the Cooking Academy, such as French cuisine, Italian cuisine, Chinese cuisine, etc.

The player does not have to accept the invitation to the Cooking Academy. If the player does not accept, the player continues with the game. If the player later changes her mind and decides to apply to the Academy, the player can open the invitation again (e.g., by clicking icon 206 of FIG. 2), and proceed to accept the invitation by clicking on the accept button 302 of FIG. 3.

In one embodiment, the player receives a quest reward after completing at least one of the quests from the plurality of quests. In another embodiment, the quest reward includes a wearable status item for an avatar of the player in the game board, as described below with reference FIG. 7. Once the player completes the basic tasks in the specialty of choice, the application is complete. If the application is accepted (which is normally the case because the player has met the prerequisites to enter the Academy), the player starts attending the Cooking Academy.

Figure 4:
FIG. 4 shows the description of a quest, according to one embodiment.

FIG. 4 shows the description of a quest, according to one embodiment. In one embodiment, the quest in the master mission (Cooking Academy) requires building a Spice Rack. The online game offers a hint to the player indicating that "to start building your Spice Rack, click 'spices' under the 'Cooking' icon at the bottom-right of the screen." Once the player completes the Spice Rack, the quest is completed, resulting in progress towards the application to the Cooking Academy. In addition, a quest reward may be awarded to the player in the form of an asset increase or a status symbol.

In one embodiment, the quests associated with the Cooking Academy are performed by the player while the player remains in the environment of Café World, and the quests require performing similar type of activities as the activities involved in regular game quests, such as cooking dishes, installing equipment, spicing a neighbor's food, etc. However, in another embodiment, the Cooking Academy is played in a different game board than the one that includes the café from Café World. When the player wants to make progress in the Cooking Academy, the Cooking Academy board is loaded to perform Cooking Academy's operations therein. The player is able to switch game activity between the game board and the Cooking Academy board, i.e., to travel between both boards at will to make progress in Café World or to make progress in the Cooking Academy.

Figure 5:
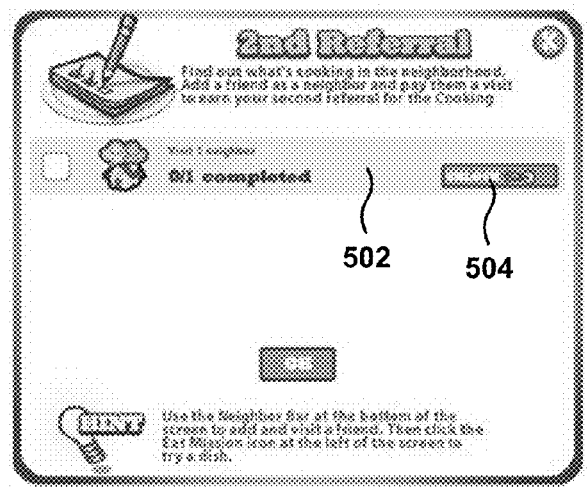
FIG. 5 shows another quest to obtain a referral from a friend, according to one embodiment.

FIG. 5 shows another quest to obtain a referral from a friend, according to one embodiment. FIG. 5 shows a second quest towards getting into the Cooking Academy, where the quest is a prerequisite for being accepted to the Cooking Academy. This quest is titled "2$^{nd}$ Referral," which requires that the player performs a game action related to a neighbor's game. However, it is noted that although "referral" is included in the quest name, this does not mean that a referral is required from a neighbor in the online game, only that the player needs to visit a neighbor to get a "referral." The quest requires visiting one neighbor 502, and the player is given the choice of completing the quest without having to visit a neighbor by making a purchase with game currency 504.

The instructions for the quest recite "find out what's cooking in the neighborhood," and to "add a friend as a neighbor and paid her a visit to earn your second referral for the Cooking Academy." The game also provides a hint, which states "use the Neighbor Bar at the bottom of the screen to add and visit a friend. Then click the Eat Mission icon at the left of the screen to try a dish."

Once the player performs the required operations, either visiting a friend or paying money to complete the quest, the quest is completed. If this is the last quest required to complete the application, then the player will be notified that the application to the Cooking Academy has been completed. Otherwise, if this is not the last quest, a new quest, or quests, are presented to the player in order to complete the application for the Cooking Academy.

Figure 6:
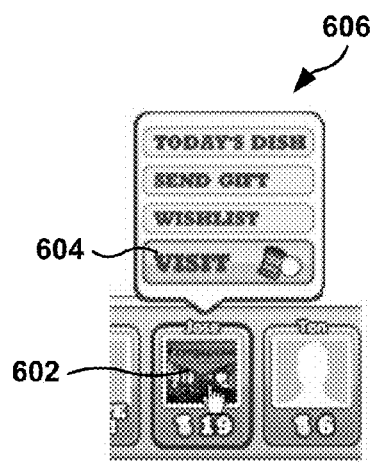
FIG. 6 illustrates an option in the online game to visit a neighbor, according to one embodiment.

FIG. 6 illustrates an option in the online game to visit a neighbor, according to one embodiment. As described above with reference to FIG. 5, a quest in the game may require visiting a neighbor. In one embodiment, the game provides a list of neighbors on the game board. See for example neighbor 124 at the bottom of FIG. 1. Referring back to FIG. 6, when the player clicks on icon 602 associated with a neighbor, a pop-up menu 606 is presented to the player. In one embodiment, pop-up menu 606 includes options to check today's dish being cooked by the neighbor, send a gift to the neighbor, check a wish list from the neighbor, or visit 604 the neighbor.

If the player selects option 604 to visit the neighbor, the game abandons the game board of the player and loads the game board of the neighbor, which in this case is the neighbor's Café. While visiting the neighbor, the player is able to perform one or more game activities to assist the neighbor. In return for helping the neighbor, the player is rewarded with game assets, such as currency or an increase in standing. In one embodiment, the player assists the neighbor by clicking on a cooking stove to spice up the dish being cooked on the stove.

Figure 7:
FIG. 7 shows a reward given to the player for completing a quest, according to one embodiment.

FIG. 7 shows a reward given to the player for completing a quest, according to one embodiment. After the player completes the quest, such as the one described with reference to FIG. 5, the player receives a reward. FIG. 7 shows an embodiment of the message telling the player of the reward obtained. The message states "Congrats! You've earned your Dark Blue Cravat. Earned your next two colors and you'll graduate Cooking Academy!" The cravat is an item worn by the avatar of the player in the online game. As the player makes progress in the Cooking Academy, the color of the cravat changes, where the color offers an indication of the progress made by the player, similar to the color of a judo belt reflecting the skill level of a judo student. For example, the player may get cravats in red, green, yellow, blue, etc., where each color indicates a different level of progress.

Other rewards given for obtaining the specialty include one or more of a name change in the game (e.g., "Master Chef John"), a change in the avatar's appearance (e.g., dressing the player's avatar with a different outfit), an improvement in efficiency to perform game operations (e.g., cooking dishes in less time), etc.

If the player completes all the quests in the Cooking Academy, the player receives the specialty, which allows the player to perform some activities in the game that are only available to the player with the specialty. For example, the specialty may allow the player to cook a dish associated with the specialty. If the player, now a Master Chef, cooks the specialty dish (e.g., a sushi roll) then the player receives a reward for cooking this dish. Having the specialty is a requirement for being able to cook the specialty dish (sushi roll).

It is noted that the embodiments illustrated in FIGS. 2-7 are exemplary. Other embodiments may utilize different animations, invitation letters, game boards, specialties, quests, be used in different types of games, etc. The embodiments illustrated in FIGS. 2-7 should therefore not be interpreted to be exclusive or limiting, but rather exemplary or illustrative.

Figure 8:
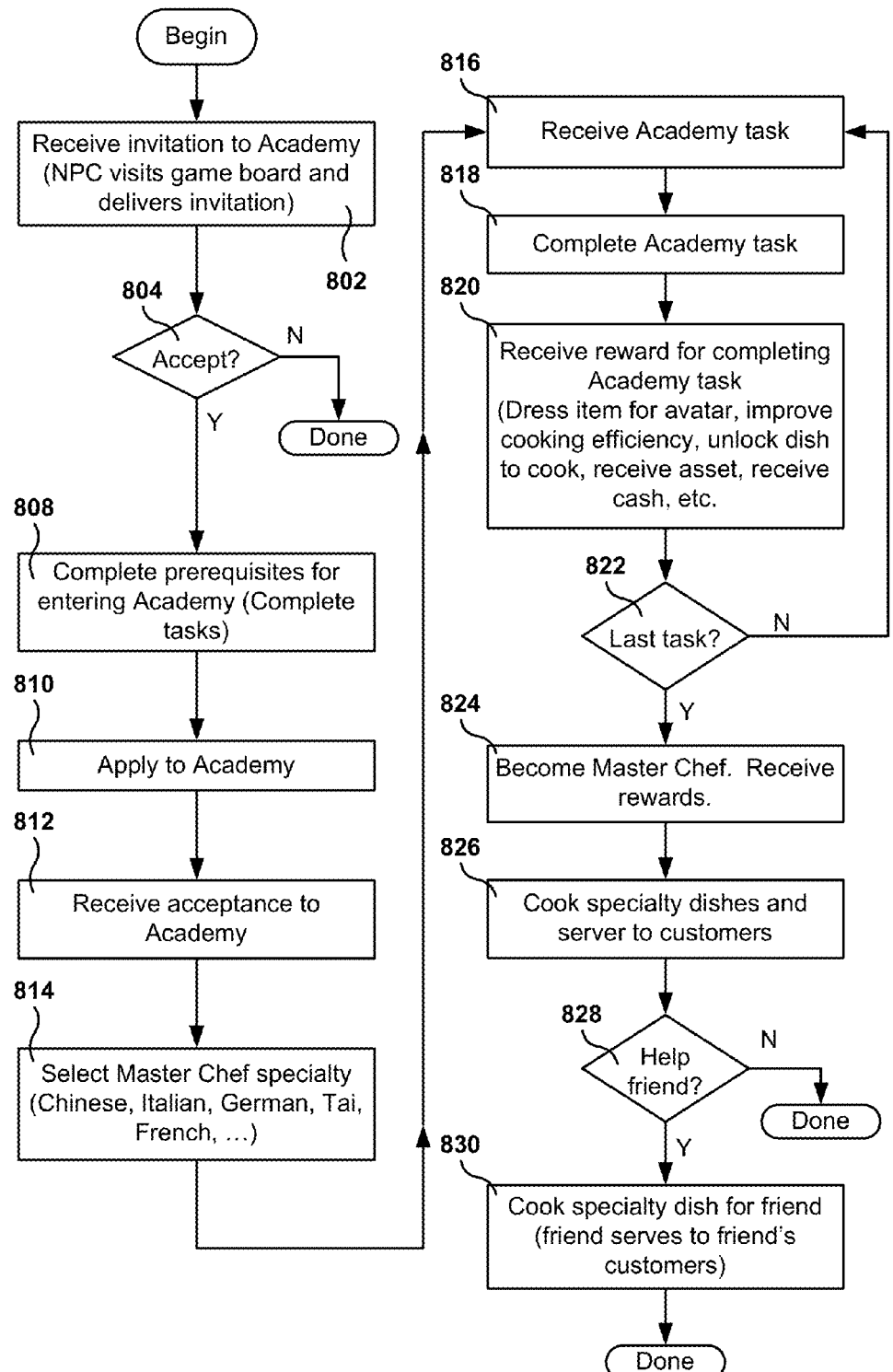
FIG. 8 shows a flowchart illustrating an algorithm for attending the cooking academy, according to one embodiment.

FIG. 8 shows a flowchart illustrating an algorithm for attending the cooking academy, according to one embodiment. In operation 802, an invitation is received by the player to join the Academy. In one embodiment, the NPC visits the game board of the player and delivers an invitation to apply to the Cooking Academy (see for example, NPC 202 in FIG. 2). If the player accepts 804 the invitation, the method continues to operation 808, where the player starts performing game operations, which include performing the prerequisites to enter the Academy. In one embodiment, the prerequisites to enter the Academy include the completion of a plurality of quests (i.e., game tasks) presented by the game. Once the player completes the prerequisite tasks, the application for the Academy is considered complete, and in operation 810, the player applies to the Academy.

After the player is accepted to the Academy 812, the player is presented with a list of possible Master Chef specialties for the Cooking Academy. In one embodiment, the specialties include different type of the cuisines from around the world, such as French, Italian, German, Chinese, etc. Once the player selects the specialty 814, the player is officially enrolled in the Cooking Academy, which means that the player is given one or more quests to start making progress in the Cooking Academy towards graduation. In one embodiment, each specialty from the plurality of specialties is a type of cooking, and the master reward includes the ability to cook dishes associated with the specialty.

In operation 816, the player receives a task for the Academy. After the player completes the task in operation 818, the method continues in operation 820, where a reward is received by the player for completing the Academy task. As described above, the reward my include an item wearable by the player's avatar, improving game skills, unlocking certain game operations that were not available before, receiving a game asset such as cash, etc.

In operation 822, the method checks if the task completed in operation 820 is the last task required to graduate from the Cooking Academy. If the task is not the last task, the method flows to operation 816, where a new task is assigned to the player. However, if the task was the last task, this means that the player has completed all the tasks required to graduate from the Cooking Academy. In operation 824, the player becomes a Master Chef in the specialty of choice. In addition, one or more rewards are given to the player for graduating from the Academy.

In operation 826, the player cooks one or more specialty dishes, and then serves the dishes to the café customers. The specialty dishes can be cooked only by a Master Chef that has earned the mastership in that specialty. For example, if the specialty is in French cuisine, the player becomes a French Master Chef, which unlocks certain dishes and other items in the game, related to French cuisine, e.g., using certain kind of equipment related to French cuisine (e.g., fondue), and serving French dishes.

In one embodiment, the Master Chef may cook specialty dishes and share the cooked specialty dishes with a neighbor. For example, a player with a master in Italian food might need to cook a French dish, which requires a French Master Chef. In operation 828, the player receives a request from a friend or neighbor for help. The help requires cooking specialty dishes and share them with the friend. If the player decides to help a friend, in operation 830, the player cooks a specialty dish for the friend, and the friend is able to serve this specialty dish to the friends customers.

In one embodiment, the player cooks the specialty dish in her own game board, and then sends the cooked dish to the neighbor. When the neighbor receives the specialty dish from the player, the specialty dish is placed on the serving area and served to the friend's customers. In another embodiment, the Master Chef visits the neighbor, which means that the game board of the neighbor is loaded on the display. While on the neighbor's game board, the Master Chef cooks the specialty dish, and, upon completion, the specialty dish is served to the friends customers.

In yet another embodiment, two Master Chefs join skills to cook a "fusion" dish. A fusion dish requires the cooperation of two Master Chefs, where the first Master Chef brings a first set of skills, and the second Master Chef brings a second set of skills different from the first set of skills. In this case, the first set of skills is associated with a first master specialty, and the second set of skills is associated with a second master specialty. When a player with a first master specialty wants to cook the fusion dish, the player searches among her neighbors for a player that has the second master specialty. The player then invites the neighbor to cook together, and if the neighbor accepts, player and neighbor cooperate in cooking the fusion dish. The operation may include one player visiting another player to cook the dish together, or have each player cook up a portion of the fusion dish, and then the players combines their portions to complete the dish. When the fusion dish is complete, the dish may be served by either player, or by both players, in their respective game boards.

Figure 9:
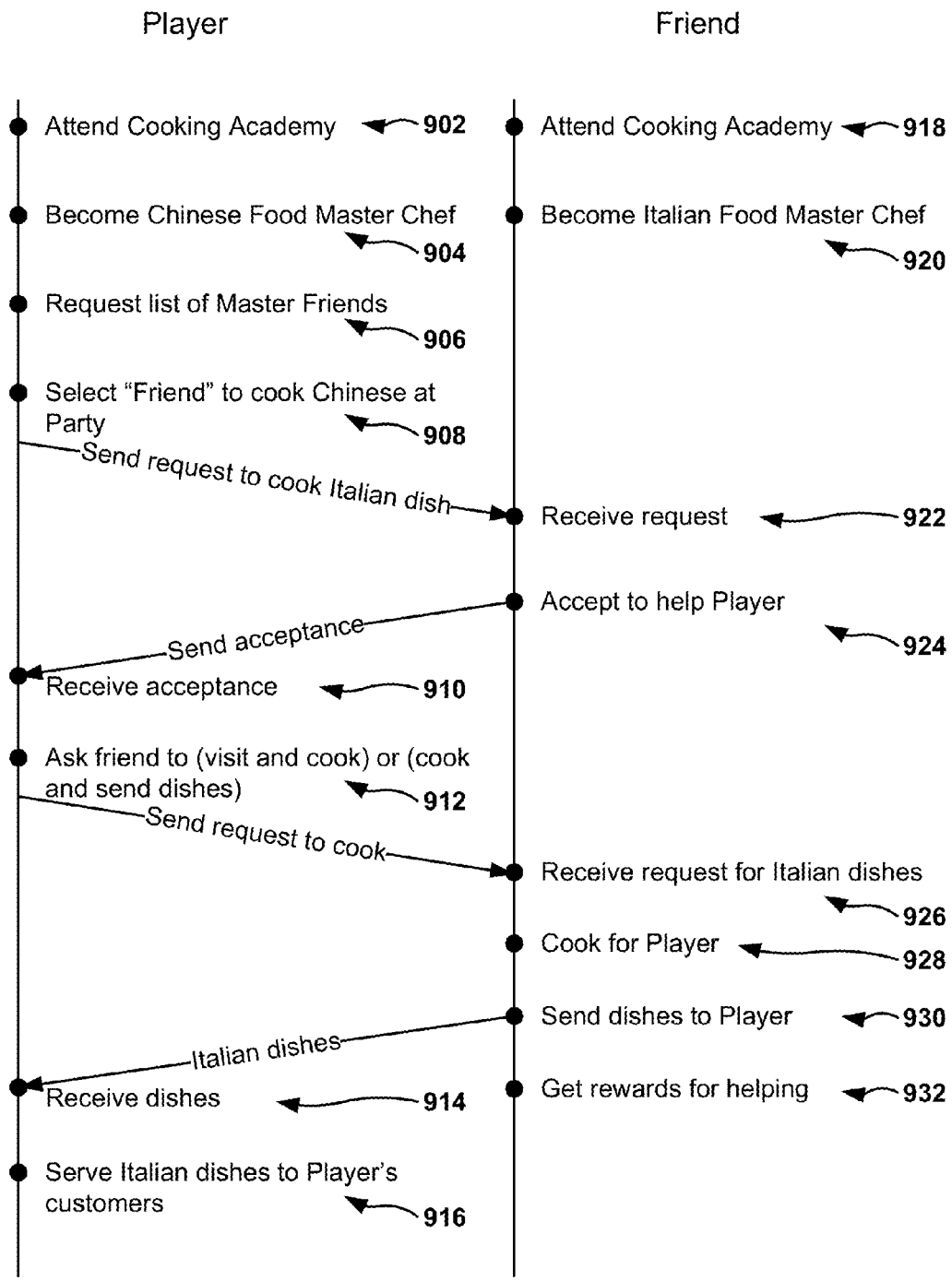
FIG. 9 shows a flowchart illustrating cooperation activities between two players of the online name, according to one embodiment.

FIG. 9 shows a flowchart illustrating cooperation activities between two players of the online name, according to one embodiment. With reference to the description of FIG. 9, there are two players cooperating in the game: the first player of the game is referred to as "Player" and the second player is referred to as "Friend." Player attends the Cooking Academy 902, and upon completion of the Cooking Academy, Player becomes a Chinese food Master Chef 904. Similarly, Friend attends the Cooking Academy 918 to become an Italian food Master Chef 920. It is noted that because Player and Friend obtain different specialties, the progress made in the game by Player in Friend is different, resulting in a game experience that is different for both players.

Player wants to serve an Italian dish that can only be cooked by an Italian food Master Chef. In order to find the Master Chef, Player requests a list of neighbors that are Italian food Master Chefs 906. After checking the list, Player selects Friend 908 to request that Friend cooks the Italian dish for Player. The online game sends a request to Friend to cook the Italian dish. When Friend receives the request 922, Friend decides if she wants to help Player. If Friend accepts 924 to help Player, then the game sends the acceptance to Player.

After Player receives the acceptance 910, Player and Friend coordinate game activities in order to cook the Italian dish. The online game sends the request for the Italian dish to Friend. In one embodiment, Player asks Friend 912 to visit Player's game board in order to cook the Italian dish there. In another embodiment, Player asks Friend to cook the Italian dish in Friends game board and then send the cooked dish to Player.

After Friend receives the request for the Italian dish 926, in operation 928 Friend cooks the Italian dish for Player. If Friend has visited player, Friend cooks the Italian dish in the game board of Player. If Friend does not visit Player, then Friend cooks the dish in her own kitchen, and then sends the dish to Player 930. Further, Friend gets a reward for helping player in the request for the Italian dish 932. The online game sends the cooked dishes to Player, and after the game board of Player receives the dishes 914, the dishes are placed in a serving area of player's game board in order to serve the Italian dishes to Player's customer 916. In one embodiment, Friend visits Player's game board to deliver the Italian dishes.

In another embodiment, the players may exchange dishes, i.e., the first player sends the second player a dish from the first player's specialty, and the second player sends the first player a dish from the second player's specialty.

Figure 10:
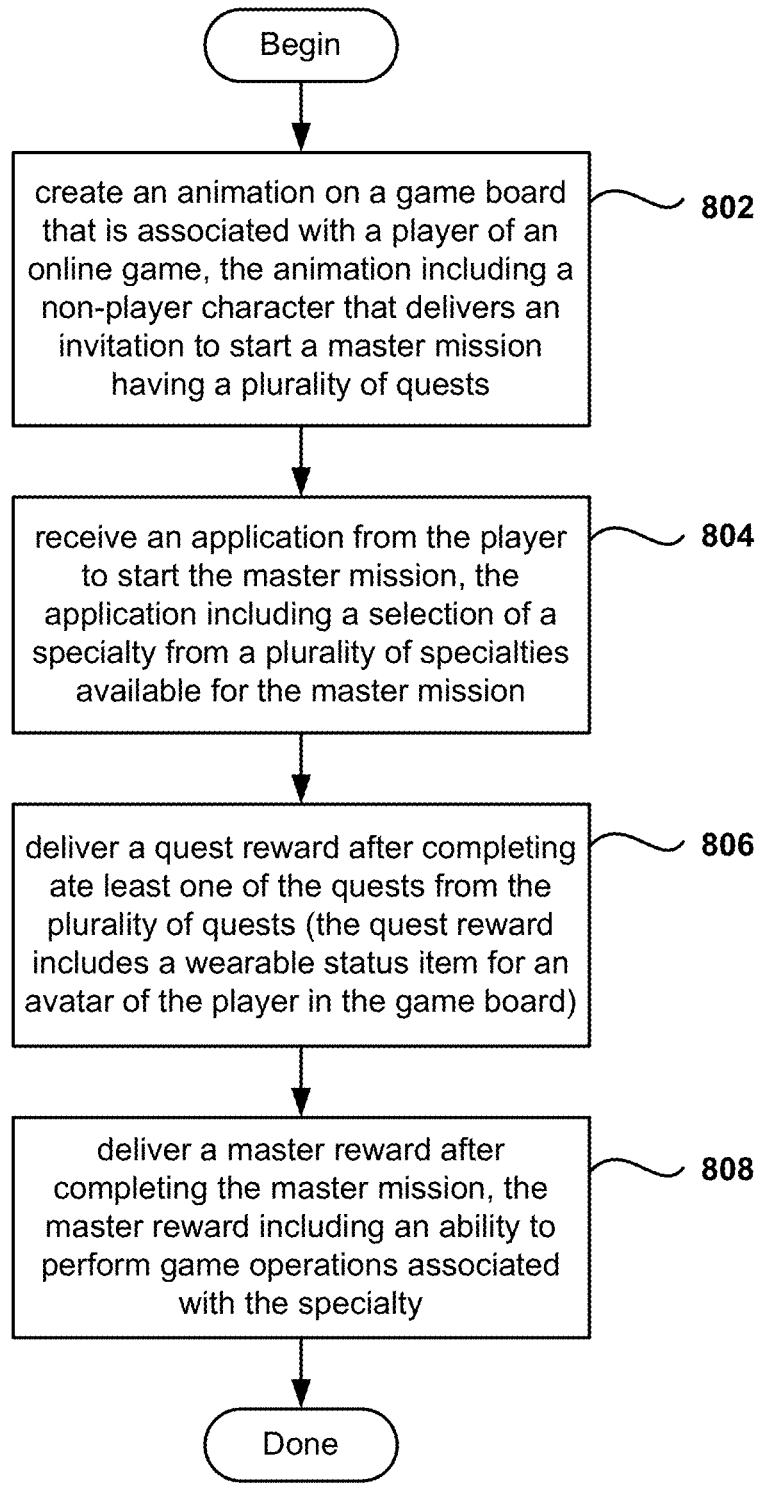
FIG. 10 shows a flowchart illustrating an algorithm for executing game actions in an online game, in accordance with one embodiment of the invention.

FIG. 10 shows a flowchart illustrating an algorithm for executing game actions in an online game, in accordance with one embodiment of the invention. In operation 802, an animation is created on the game board associated with a player of an online game. The animation includes an NPC that delivers an invitation to start a master mission, which has a plurality of quests. After operation 802, the method continues in operation 804, where an application from the player is received, the application being submitted to start the master mission. The application includes the selection of a specialty from a plurality of specialties available for the master mission. For example, the master mission is graduating from the Cooking Academy, and the specialty may include a type of cooking (e.g., Italian, Chinese, German, etc.) or may include other type of specialty, such as desserts, wedding cakes, appetizers, catering, etc.

The method further includes an operation 806 for delivering a quest reward, after completing one of the quests from the plurality of quests. In one embodiment, the quest reward includes a wearable status item for an avatar of the player in the game board, but other types of rewards are also possible, such as game currency, skill level, etc. From operation 806, the method flows to operation 808, where a master reward is delivered after the completion of the master mission. The master reward gives the player the ability to perform game operations associated with the specialty, and at least one operation of the method is executed through a processor. In one embodiment, the operations of the method are performed by a computer program when executed by one or more processors, the computer program being embedded in a non-transitory computer-readable storage medium.

Figure 11:
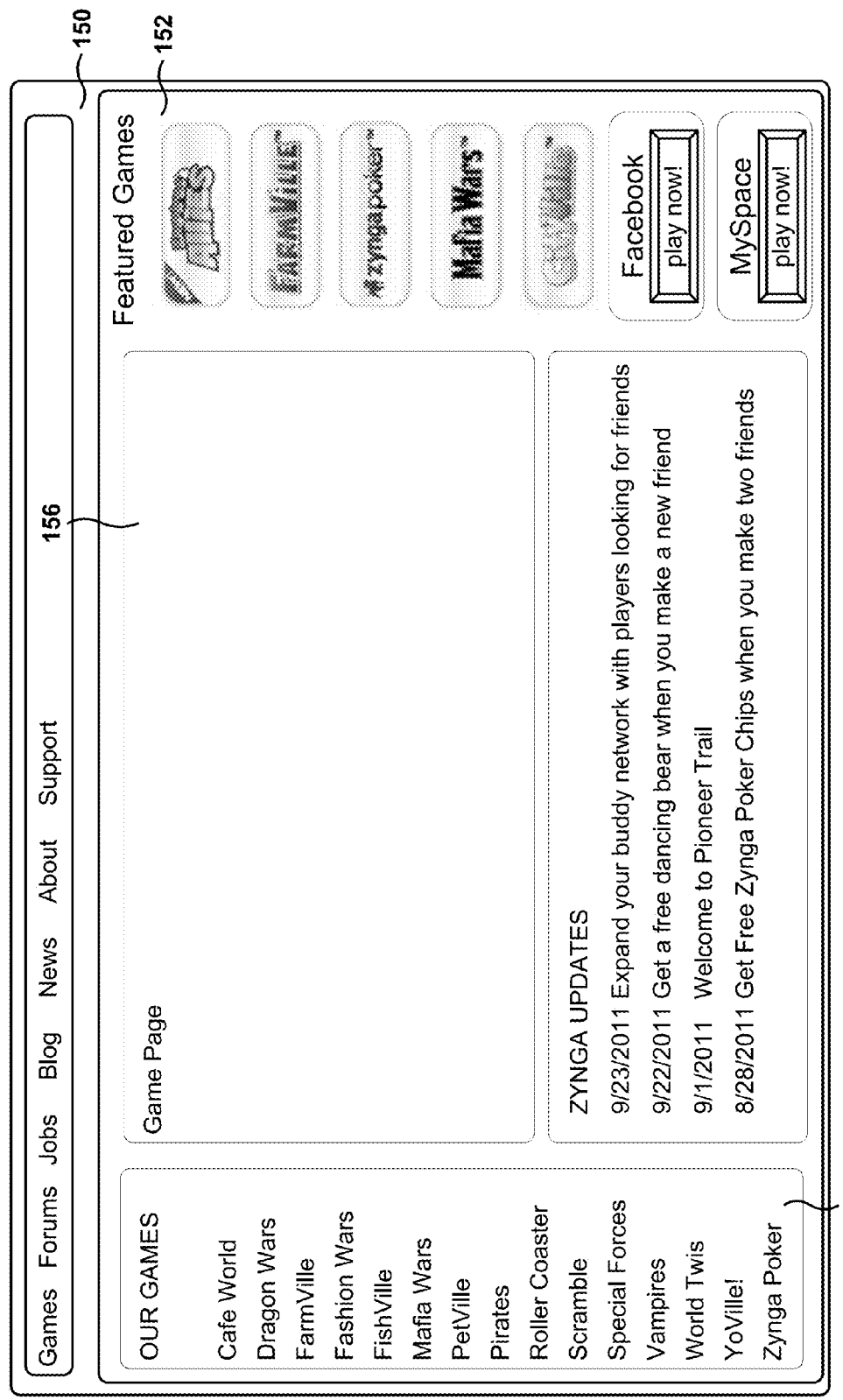
FIG. 11 illustrates an embodiment of a web page for playing an online game.

FIG. 11 illustrates an embodiment of a web page 150 for playing an online game. A web page is a structured document or resource of information that is suitable for a computer network, such as the World Wide Web, the Internet, or an Intranet. A web page is identified by a unique Uniform Resource Locator (URL) and may be accessed through a web browser and displayed on the screen of a network device. Some web pages are dynamic and are constructed at the time the web page is requested by a network user. As a result, the actual content included in dynamic web pages may vary over time. In addition, web pages may include multimedia content (e.g., image, video, or audio), or embedded references thereto, as well as text content.

Web page 150 is one embodiment of a page designed for playing games online via web browsers. In this embodiment, a list of games is presented for selection by the player, and a list of featured games 152 identifies popular games. In one embodiment, the game is played in game area 156 as an embedded component that may use any technology for presenting multimedia dynamic content, such as Hyper Text Markup Language 5 (HTML5), Adobe Flash®, etc.

Adobe Flash (formerly known as Macromedia Flash) is a multimedia platform for adding animation and interactivity to web pages. A Flash component (e.g., game area 156) may be embedded in a web page (e.g., web page 150) to create animation, advertisements, or games and to integrate video into the web page. Adobe Flash can manipulate vector and raster graphics and support bidirectional streaming of audio and video. In one embodiment, Adobe Flash libraries are used with the Extensible Markup Language (XML) capabilities of the web browsers to render rich content in the browsers. This technology is known as Asynchronous Flash and XML.

Another technology for displaying dynamic content in a web page is HTML5. HTML5's features include media playback and offline storage. With a predecessor version to HTML5, named HTML4, sites have to reach for Adobe Flash (or Silverlight) to show a video or play music. However, HTML5 lets sites directly embed media using Hyper Text Markup Language (HTML) tags (e.g., "<video>" and "<audio>"), and plugins are not required.

In one embodiment, games include objects, such as characters, currencies, tools, assets, social relations, etc. For example, in a war game, the characters may be the soldiers fighting on respective sides of the war. In addition, there may be weapons used by the soldiers and objects around the battlefield (e.g., buildings, trees, animals, mountains, rivers, and so on). Each game object may be defined according to a predetermined syntax. For example, the definition of a game object may include shape, texture, physical capabilities, connection or relationship with other game objects, etc.

In another embodiment, a game application is embedded in a web page (e.g., web page 150) and the players play the game via web browsers. The display of a game is sometimes referred to as the "stage" of the game. Thus, the stage of the game may be implemented as Adobe Flash or HTML5 component embedded in the web page. For example, the stage is essentially a data structure that defines some of the basic elements of the game, such as aspect ratio and display size. At any given time, a game scene may be rendered and displayed on the stage by attaching one or more game objects to the stage.

Figure 12:
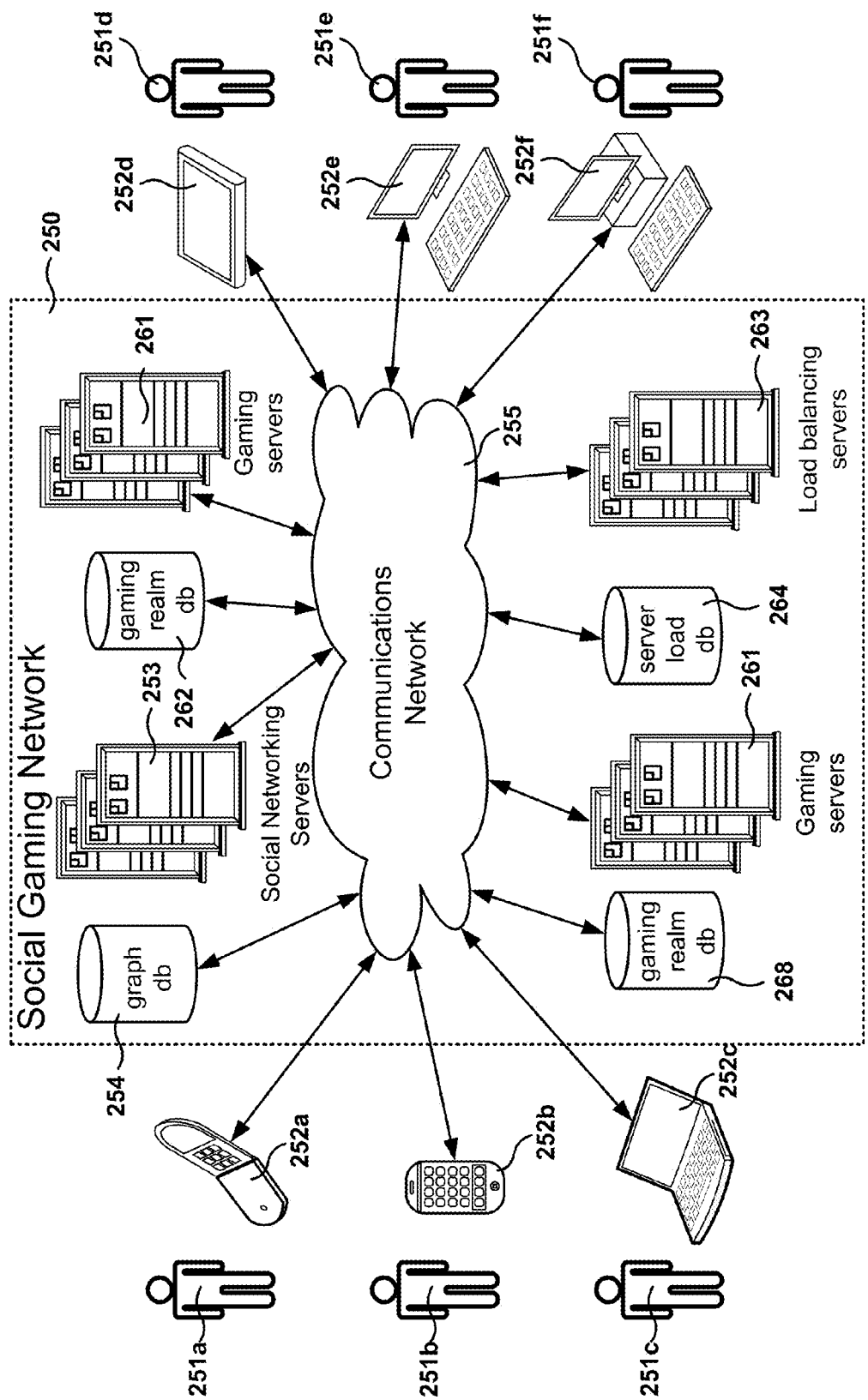
FIG. 12 shows a block diagram illustrating a social gaming network architecture, according to one embodiment.

FIG. 12 shows a block diagram illustrating a social gaming network architecture, according to one embodiment. In some implementations, a plurality of players (e.g., 251a-251f) may be utilizing a social gaming network 250. Each player interacts with the social gaming network via one or more client devices (e.g., client devices 252a-252f). The clients may communicate with each other and with other entities affiliated with the gaming platform via communications network 255. Further, the players may be utilizing a social networking service provided by a social networking server (e.g., social networking servers 253) to interact with each other.

When a player provides an input into the player's client device, the client device may in response send a message via the communications network to the social networking server. The social networking server may update the player profile, save the message to a database, send messages to other players, etc. The social gaming network may include a social graph database 254, which stores player relationships, social player profiles, player messages, and player social data.

The gaming servers 261 host one or more gaming applications, and perform the computations necessary to provide the gaming features to the players and clients. One or more gaming realm databases 262 store data related to the gaming services, such as the gaming applications and modules, virtual gaming environment ("realm") data, player gaming session data, player scores, player virtual gaming profiles, game stage levels, etc. The gaming servers may utilize the data from the gaming realm databases to perform the computations related to providing gaming services for the players. In some implementations, a server load database 264 stores gaming server load statistics, such as computational load, server responses times, etc. The social gaming network may include one or more load balancing servers 263.

Figure 13:
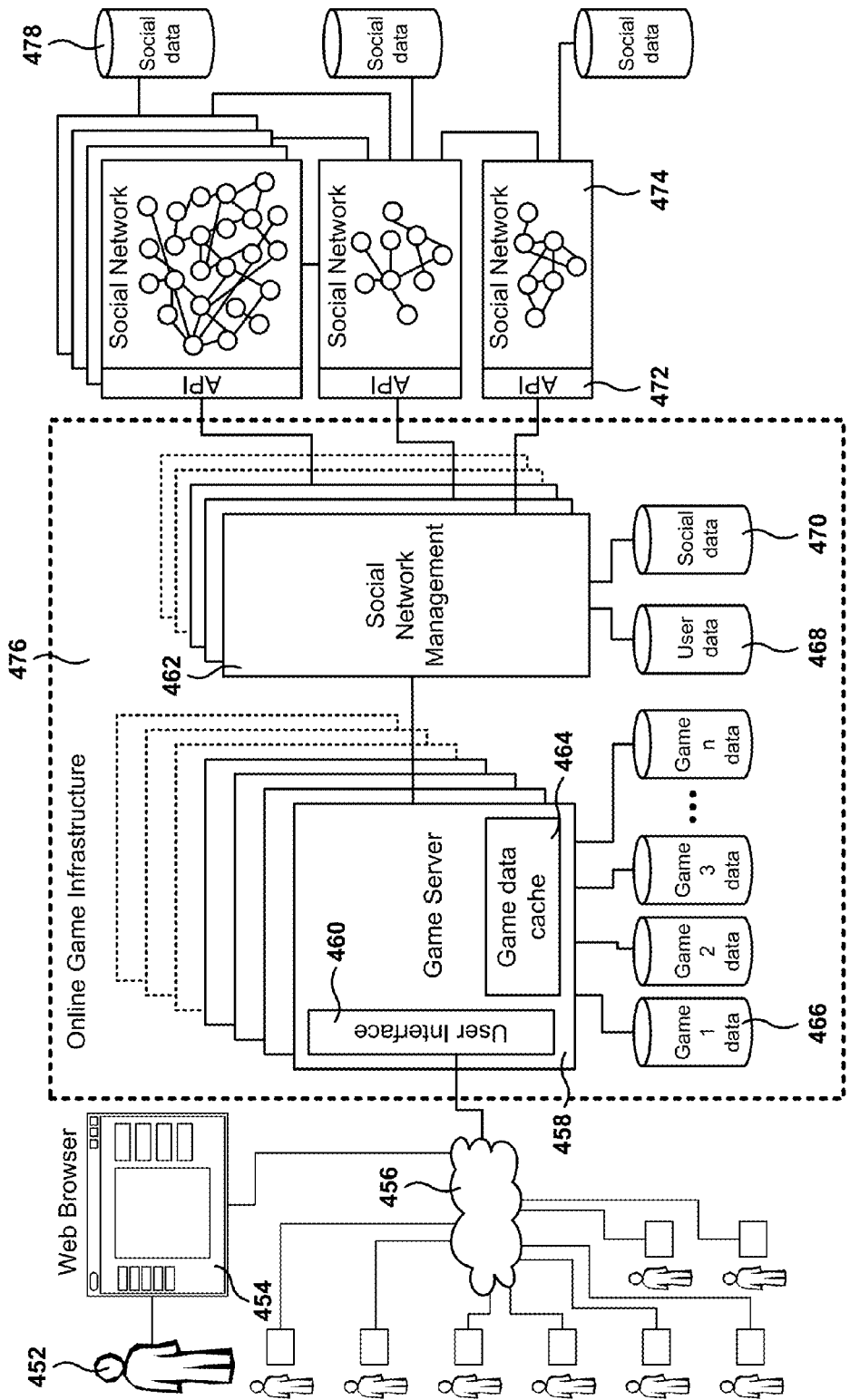
FIG. 13 illustrates an implementation of a Massively Multiplayer Online (MMO) infrastructure, according to one embodiment.

FIG. 13 illustrates an implementation of an online game infrastructure, according to one embodiment. The online game infrastructure 476 includes one or more game servers 458, web servers (not shown), one or more social network management servers 462, and databases to store game related information. In one embodiment, game server 458 provides a user interface 460 for players 452 to play the online game. In one embodiment, game server 458 includes a Web server for players 452 to access the game via web browser 454, but the Web server may also be hosted in a server different from game server 458. Network 456 interconnects players 452 with the one or more game servers 458.

Each game server 458 has access to one or more game databases 466 for keeping game data. In addition, a single database can store game data for one or more online games. Each game server 458 may also includes one or more levels of caching. Game data cache 464 is a game data cache for the game data stored in game databases 466. For increased performance, caching may be performed in several levels of caching. For instance, data more frequently used is stored in a high priority cache, while data requiring less access during a session will be cached and updated less frequently.

The number of game servers 458 changes over time, as the gaming platform is an extensible platform that changes the number of game servers according to the load on the gaming infrastructure. As a result, the number of game servers will be higher during peak playing times, and the number of game servers will be lower during off-peak hours. In one embodiment, the increase or decrease of bandwidth is executed automatically, based on current line usage or based on historical data.

One or more social network management servers 462 provide support for the social features incorporated into the online games. The social network management servers 462 access social data 478 from one or more social networks 474 via Application Programming Interfaces (API) 472 made available by the social network providers. Each social network 474 includes social data 478, and this social data 478, or a fraction of the social data, is made available via API 472. As in the case of the game servers, the number of social network management servers 462 that are active at a point in time changes according to the load on the infrastructure. As the demand for social data increases, the number of social network management servers 462 increases. Social network management servers 462 cache user data in database 468, and social data in database 470. The social data may include the social networks where a player is present, the social relationships for the player, the frequency of interaction of the player with the social network and with other players, etc. Additionally, the user data kept in database 468 may include the player's name, demographics, e-mail, games played, frequency of access to the game infrastructure, etc.

It is noted that the embodiment illustrated in FIG. 13 is an exemplary online gaming infrastructure. Other embodiments may utilize different types of servers, databases, APIs, etc., and the functionality of several servers can be provided by a single server, or the functionality can be spread across a plurality of distributed servers. The embodiment illustrated in FIG. 13 should therefore not be interpreted to be exclusive or limiting, but rather exemplary or illustrative.

Figure 14:
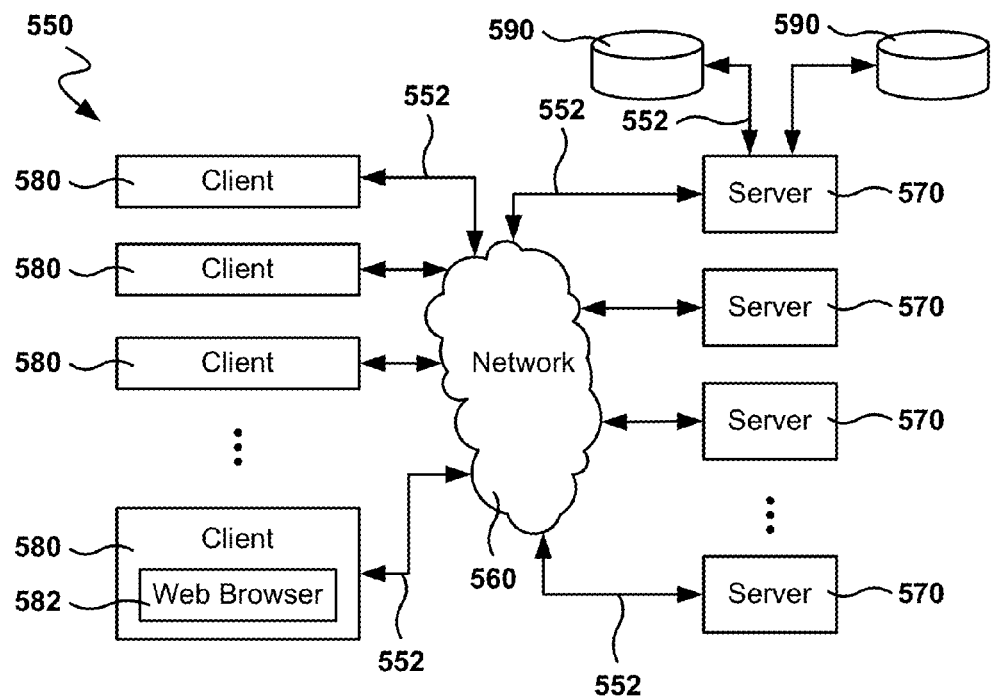
FIG. 14 illustrates an example network environment suitable for implementing embodiments of the invention.

FIG. 14 illustrates an example network environment 550 suitable for implementing embodiments of the invention. Network environment 550 includes a network 560 coupling one or more servers 570 and one or more clients 580 to each other. In particular embodiments, network 560 is an intranet, an extranet, a virtual private network (VPN), a local area network (LAN), a wireless LAN (WLAN), a wide area network (WAN), a metropolitan area network (MAN), a portion of the Internet, another network, or a combination of two or more such networks 560.

One or more links 552 couple a server 570 or a client 580 to network 560. In particular embodiments, one or more links 552 each includes one or more wireline, wireless, or optical links 552. In particular embodiments, one or more links 552 each includes an intranet, an extranet, a VPN, a LAN, a WLAN, a WAN, a MAN, a portion of the Internet, or another link 552 or a combination of two or more such links 552.

Each server 570 may be a stand-alone server or may be a distributed server spanning multiple computers or multiple datacenters. Servers 570 may be of various types, such as, for example and without limitation, web server, news server, mail server, message server, advertising server, file server, application server, exchange server, database server, or proxy server. Each server 570 may include hardware, software, embedded logic components, or a combination of two or more such components for carrying out the appropriate functionalities implemented or supported by server 570. For example, a web server is generally capable of hosting websites containing web pages or particular elements of web pages. More specifically, a web server may host HTML files or other file types, or may dynamically create or constitute files upon a request, and communicate them to clients 580 in response to HTTP or other requests from clients 580. A mail server is generally capable of providing electronic mail services to various clients 580. A database server is generally capable of providing an interface for managing data stored in one or more data stores.

In particular embodiments, one or more data storages 590 may be communicatively linked to one or more severs 570 via one or more links 552. Data storages 590 may be used to store various types of information. The information stored in data storages 590 may be organized according to specific data structures. In particular embodiments, each data storage 590 may be a relational database. Particular embodiments may provide interfaces that enable servers 570 or clients 580 to manage, e.g., retrieve, modify, add, or delete, the information stored in data storage 590.

In particular embodiments, each client 580 may be an electronic device including hardware, software, or embedded logic components or a combination of two or more such components and capable of carrying out the appropriate functionalities implemented or supported by client 580. For example and without limitation, a client 580 may be a desktop computer system, a notebook computer system, a netbook computer system, a handheld electronic device, or a mobile telephone. A client 580 may enable a network player at client 580 to access network 580. A client 580 may enable its player to communicate with other players at other clients 580. Further, each client 580 may be a computing device, such as a desktop computer or a work station, or a mobile device, such as a notebook computer, a network computer, or a smart telephone.

In particular embodiments, a client 580 may have a web browser 582, such as MICROSOFT INTERNET EXPLORER, GOGGLE CHROME, or MOZILLA FIREFOX, and may have one or more add-ons, plug-ins, or other extensions. A player at client 580 may enter a Uniform Resource Locator (URL) or other address directing the web browser 582 to a server 570, and the web browser 582 may generate a Hyper Text Transfer Protocol (HTTP) request and communicate the HTTP request to server 570. Server 570 may accept the HTTP request and communicate to client 580 one or more Hyper Text Markup Language (HTML) files responsive to the HTTP request. Client 580 may render a web page based on the HTML files from server 570 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Web browser 582 may be adapted for the type of client 580 where the web browser executes. For example, a web browser residing on a desktop computer may differ (e.g., in functionalities) from a web browser residing on a mobile device. A user of a social networking system may access the website via web browser 582.

Figure 15:
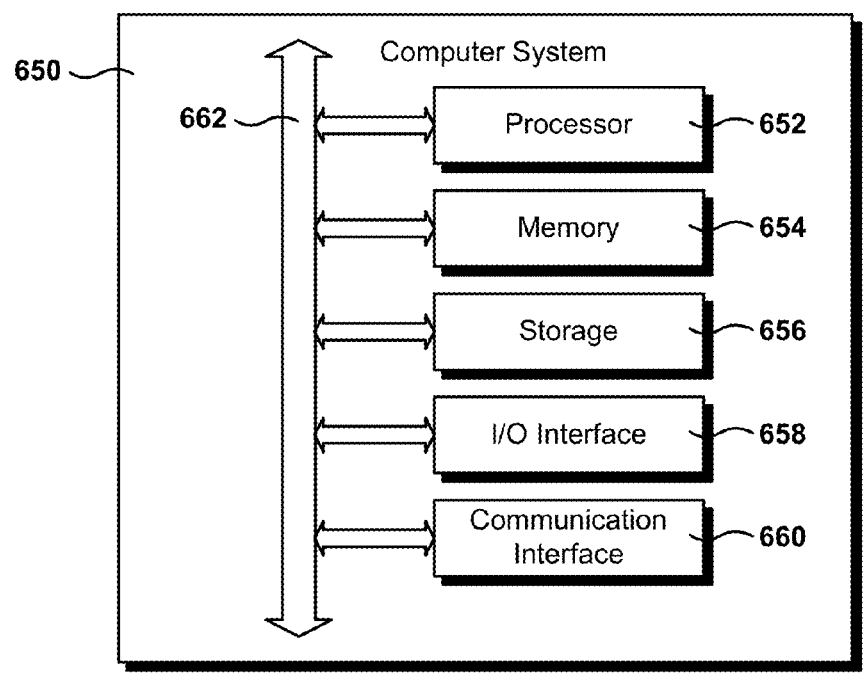
FIG. 15 illustrates an example computer system for implementing embodiments of the invention.

FIG. 15 illustrates an example computer system 650 for implementing embodiments of the invention. In particular embodiments, software running on one or more computer systems 650 performs one or more operations of one or more methods described or illustrated herein or provides functionality described or illustrated herein. Although methods for implementing embodiments were described with a particular sequence of operations, it is noted that the method operations may be performed in different order, or the timing for the execution of operations may be adjusted, or the operations may be performed in a distributed system by several entities, as long as the processing of the operations are performed in the desired way.

As example and not by way of limitation, computer system 650 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 650 may include one or more computer systems 650; be stand-alone or distributed; span multiple locations; span multiple machines; or reside in a cloud, which may include one or more cloud components in one or more networks. The one or more computer systems 650 may perform in real time or in batch mode one or more operations of one or more methods described or illustrated herein.

In particular embodiments, computer system 650 includes a processor 652, memory 654, storage 656, an input/output (I/O) interface 658, a communication interface 660, and a bus 662. Although this disclosure describes and illustrates a particular computer system having a particular number of particular components in a particular arrangement, embodiments of the invention may be implemented with any suitable computer system having any suitable number of any suitable components in any suitable arrangement.

In particular embodiments, processor 652 includes hardware for executing instructions, such as those making up a computer program. As an example and not by way of limitation, to execute instructions, processor 652 may retrieve (or fetch) the instructions from an internal register, an internal cache, memory 654, or storage 656; decode and execute them; and then write one or more results to an internal register, an internal cache, memory 654, or storage 656. The present disclosure contemplates processor 652 including any suitable number of any suitable internal registers, where appropriate. Where appropriate, processor 652 may include one or more arithmetic logic units (ALUs); be a multi-core processor; or include one or more processors 652. Although this disclosure describes and illustrates a particular processor, this disclosure contemplates any suitable processor.

In particular embodiments, memory 654 includes main memory for storing instructions for processor 652 to execute, or data that can be manipulated by processor 652. As an example and not by way of limitation, computer system 650 may load instructions from storage 656 or another source (such as, for example, another computer system 650) to memory 654. Processor 652 may then load the instructions from memory 654 to an internal register or internal cache. During or after execution of the instructions, processor 652 may write one or more results (which may be intermediate or final results) to the internal register or internal cache. Processor 652 may then write one or more of those results to memory 654. One or more memory buses (which may each include an address bus and a data bus) may couple processor 652 to memory 654. Bus 662 may include one or more memory buses, as described below. One or more memory management units (MMUs) reside between processor 652 and memory 654 and facilitate accesses to memory 654 requested by processor 652. Memory 654 includes random access memory (RAM).

As an example and not by way of limitation, storage 656 may include an HDD, a floppy disk drive, flash memory, an optical disc, a magneto-optical disc, magnetic tape, or a Universal Serial Bus (USB) drive or a combination of two or more of these. Storage 656 may include removable or non-removable (or fixed) media, where appropriate. In particular embodiments, storage 656 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these.

In particular embodiments, I/O interface 658 includes hardware, software, or both providing one or more interfaces for communication between computer system 650 and one or more I/O devices. One or more of these I/O devices may enable communication between a person and computer system 650. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these.

Communication interface 660 includes hardware, software, or both providing one or more interfaces for communication between computer system 650 and one or more other computer systems 650 on one or more networks. As an example and not by way of limitation, communication interface 660 may include a network interface controller (NIC) or network adapter for communicating with an Ethernet or other wire-based network or a wireless NIC (WNIC) or wireless adapter for communicating with a wireless network, such as a WI-FI network. As an example, computer system 650 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these.

In particular embodiments, bus 662 includes hardware, software, or both coupling components of computer system 650 to each other. As an example and not by way of limitation, bus 662 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 662 may include one or more buses 662, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure that may store a computer program or data. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a Secure Digital card, a Secure Digital drive, or another suitable computer-readable storage medium or a combination of two or more of these, where appropriate. Herein, reference to a computer-readable storage medium excludes any medium that is not eligible for patent protection under 35 U.S.C. §101.

One or more embodiments of the present invention can also be fabricated as computer readable code on a non-transitory computer readable medium. Herein, reference to software may encompass one or more applications, bytecode, one or more computer programs, one or more executables, one or more instructions, logic, machine code, one or more scripts, or source code, and vice versa, where appropriate.

The present disclosure encompasses all changes, substitutions, variations, alterations, and modifications to the example embodiments herein that a person having ordinary skill in the art would comprehend.

What is claimed is:

1. A method for executing an online game on a server, the method comprising:
    exchanging, by a processor of the server, messages with a plurality of computer client devices, the messages configured to provide respective user interfaces to play the online game, wherein a different separate game board is created for each player of a plurality of players associated with a respective one of the plurality of computer client devices in the online game a first time the online game is played by each player;
    creating, by the processor of the server in a user interface of a first player of said plurality of players, an animation on a first game board, the first board being created the first time the online game is played by the first player, the animation including a non-player character that delivers an invitation to the first player to start a master mission of the online game;
    receiving, by the processor of the server, an input, via one or more input devices coupled to the computer client device of the first player, from the first player to start the master mission, the input including a selection of a specialty from a plurality of specialties available for the master mission;
    creating, by the processor of the server, a plurality of quests for completing the master mission, wherein the plurality of quests are selected based on the selected specialty;
    delivering, by the processor of the server, a quest reward after the first player completes at least one of the quests from the plurality of quests, wherein the quest reward includes a wearable status item for an avatar of the first player in the first game board;
    delivering, by the processor of the server, a master reward after completion of the plurality of quests of the master mission, the master reward including an ability to perform game operations associated with the specialty; and
    sending, by the processor of the server, from the first player a specialty reward to a second player, wherein the specialty reward is configured to be utilized by the second player in a second game board of the second player, the second game board being different from the first game board.

2. The method as recited in claim 1, wherein the plurality of quests are performed on the first game board, wherein the first player performs other game tasks on the first game board while performing the plurality of quests.

3. The method as recited in claim 1, further including:
    creating, by the processor of the server, in response to the receiving of the input, a specialty game board in the user interface provided to the first player, wherein one or more quests from the plurality of quests are performed on the specialty game board which is different from the first game board, and wherein the first player is able to switch game activity between the first game board and the specialty game board in a client computer used by the first player for playing the online game.

4. The method as recited in claim 1 further including:
    delivering, by the processor of the server, a specialty completion reward to the first player after the first player performs a game operation utilizing the specialty, wherein the specialty completion reward requires having the specialty before obtaining the specialty completion reward.

5. The method as recited in claim 1, wherein the online game is a cooking game, and wherein the master mission is attending a cooking academy.

6. The method as recited in claim 5, wherein the quest reward is a chef cravat, and wherein the non-player character is a chef.

7. The method as recited in claim 5, wherein each specialty from the plurality of specialties is associated with a plurality of dishes in a cooking game, and wherein the master reward further includes an ability to cook the plurality of dishes associated with the specialty.

8. The method as recited in claim 1, further including:
    detecting, by the processor of the server, that the first player in the online game has reached a predetermined level before creating the animation to deliver the invitation.

9. The method as recited in claim 1, further including:
    detecting, by the processor of the server, that a second player which is a neighbor of the first player in the online game has sent a referral to invite the first player.

10. The method as recited in claim 1, wherein each player manages the each player's respective own game board, wherein players visit other player's game boards by exiting the game board of the player and entering the game board of the player being visited without changing the client computer used by each player.

11. A non-transitory computer-readable storage medium storing a computer program for executing an online game on a server, the non-transitory computer-readable storage medium comprising:

program instructions for exchanging, by a processor of the server, messages with a plurality of computer client devices, the messages configured to provide respective user interfaces to play the online game, wherein a different separate game board is created for each player of a plurality of players associated with a respective one of the plurality of computer client devices in the online game a first time the online game is played by each player;

program instructions for creating, by the processor of the server in a user interface of a first player of said plurality of players, an animation on a first game board, the first board being created the first time the online game is played by the first player, the animation including a non-player character that delivers an invitation to the first player to start a master mission of the online game;

program instructions for receiving, by the processor of the server, an input, via one or more input devices coupled to the computer client device of the first player, from the first player to start the master mission, the input including a selection of a specialty from a plurality of specialties available for the master mission;

program instructions for creating, by the processor of the server, a plurality of quests for completing the master mission, wherein the plurality of quests are selected based on the selected specialty;

program instructions for delivering, by the processor of the server, a quest reward after the first player completes at least one of the quests from the plurality of quests, wherein the quest reward includes a wearable status item for an avatar of the first player in the first game board;

program instructions for delivering, by the processor of the server, a master reward after completion of the plurality of quests of the master mission, the master reward including an ability to perform game operations associated with the specialty; and program instructions for sending, by the processor of the server, from the first player a specialty reward to a second player, wherein the specialty reward is configured to be utilized by the second player in a second game board of the second player, the second game board being different from the first game board.

12. The non-transitory computer-readable storage medium as recited in claim 11, wherein the plurality of quests are performed on the first game board, wherein the first player performs other game tasks on the first game board while performing the plurality of quests.

13. The non-transitory computer-readable storage medium as recited in claim 11, further including:

program instructions for creating, by the processor of the server, in response to the receiving of the input, a specialty game board in the user interface provided to the first player, wherein one or more quests from the plurality of quests are performed on the specialty game board which is different from the first game board, and wherein the first player is able to switch game activity between the first game board and the specialty game board in a client computer used by the first player for playing the online game.

14. The non-transitory computer-readable storage medium as recited in claim 11, further including:

program instructions for delivering, by the processor of the server, a specialty completion reward to the first player after the first player performs a game operation utilizing the specialty, wherein the specialty completion reward requires having the specialty before obtaining the specialty completion reward.

15. The non-transitory computer-readable storage medium as recited in claim 11, wherein the online game is a cooking game, and wherein the master mission is attending a cooking academy.

16. The non-transitory computer-readable storage medium as recited in claim 15, wherein the quest reward is a chef cravat, and wherein the non-player character is a chef.

17. The non-transitory computer-readable storage medium as recited in claim 15, wherein each specialty from the plurality of specialties is associated with a plurality of dishes in a cooking game, and wherein the master reward further includes an ability to cook the plurality of dishes associated with the specialty.

18. The non-transitory computer-readable storage medium as recited in claim 11, further including:

program instructions for detecting, by the processor of the server, that the first player in the online game has reached a predetermined level before creating the animation to deliver the invitation.

19. The non-transitory computer-readable storage medium as recited in claim 11, further including:

program instructions for detecting, by the processor of the server, that a second player which is a neighbor of the first player in the online game has sent a referral to invite the first player.

20. The non-transitory computer-readable storage medium as recited in claim 11, wherein each player manages the each player's respective own game board, wherein players visit other player's game boards by exiting the game board of the player and entering the game board of the player being visited without changing the client computer used by each player.

* * * * *